United States Patent
Phely

(10) Patent No.: US 10,039,226 B2
(45) Date of Patent: Aug. 7, 2018

(54) WHEEL FORMING AN IMPROVED AGRICULTURAL TOOL

(71) Applicant: OTICO, Chalmaison (FR)

(72) Inventor: Olivier Phely, Thenisy (FR)

(73) Assignee: OTICO, Chalmaison (FR)

( * ) Notice: Subject to any disclaimer, the term of this patent is extended or adjusted under 35 U.S.C. 154(b) by 275 days.

(21) Appl. No.: 14/617,086

(22) Filed: Feb. 9, 2015

(65) Prior Publication Data
US 2015/0223389 A1   Aug. 13, 2015

(30) Foreign Application Priority Data
Feb. 10, 2014   (FR) ...................... 14 51000

(51) Int. Cl.
| | | |
|---|---|---|
| *A01C 7/20* | (2006.01) | |
| *B60B 3/08* | (2006.01) | |
| *A01C 5/06* | (2006.01) | |
| *B60B 25/00* | (2006.01) | |
| *B60B 5/02* | (2006.01) | |

(52) U.S. Cl.
CPC .............. *A01C 5/068* (2013.01); *A01C 7/205* (2013.01); *B60B 25/004* (2013.01); *B60B 25/006* (2013.01); *B60B 5/02* (2013.01); *B60B 2900/112* (2013.01); *B60B 2900/113* (2013.01); *B60B 2900/115* (2013.01); *B60B 2900/325* (2013.01); *B60B 2900/3312* (2013.01)

(58) Field of Classification Search
CPC ....... A01B 15/00; A01B 29/043; A01C 5/068; A01C 7/205; B60B 3/002; B60B 3/08; B60B 5/02; B60B 23/10; B60B 25/002; B60B 25/04; B60B 27/0005; B60B 25/004; B60B 25/006

USPC .......... 111/194; 172/519, 538, 604; 152/453, 152/454, 456, 523; 301/64.303, 64.305
See application file for complete search history.

(56) References Cited

U.S. PATENT DOCUMENTS

| | | | |
|---|---|---|---|
| 921,557 A | 5/1909 | Mussetter | |
| 1,087,816 A | 2/1914 | Ogden | |
| 1,282,305 A * | 10/1918 | Simmons | .................. B60B 3/10 |
| | | | 301/11.1 |
| 2,152,957 A * | 4/1939 | Fortney | ................... B60B 25/04 |
| | | | 301/64.303 |
| 2,731,900 A | 1/1956 | Oehler | |
| (Continued) | | | |

OTHER PUBLICATIONS

French Preliminary Search Report dated Oct. 20, 2014 in French Application 14 51000, filed on Feb. 10, 2014 ( with English Translation of Categories of Cited Documents).

(Continued)

*Primary Examiner* — Robert E Pezzuto
(74) *Attorney, Agent, or Firm* — Oblon, McClelland, Maier & Neustadt, L.L.P.

(57) ABSTRACT

A tool for working in fields includes a first flange and a second flange which mount one on the other, forming a wheel body. The first flange includes a central portion, a generally annular peripheral portion and at least one arm which connect(s) the central portion and the peripheral portion to each other. The second flange is homologous to the peripheral portion of the first flange. In the assembled state, the wheel body has a rim which is formed together by the peripheral portion of the first flange and the second flange and a hub which is formed by the central portion of the first flange.

16 Claims, 6 Drawing Sheets

(56) References Cited

U.S. PATENT DOCUMENTS

| | | | | | |
|---|---|---|---|---|---|
| 2,848,278 | A | * | 8/1958 | Todd | B60B 3/08 |
| | | | | | 152/327 |
| 4,733,730 | A | * | 3/1988 | Murray | A01C 5/068 |
| | | | | | 111/135 |
| 5,533,793 | A | | 7/1996 | Walker | |
| 6,295,939 | B1 | * | 10/2001 | Emms | A01C 5/068 |
| | | | | | 111/194 |

OTHER PUBLICATIONS

U.S. Appl. No. 14/617,033, filed Feb. 9, 2015, Phely, et al.
U.S. Appl. No. 14/617,123, filed Feb. 9, 2015, Phely.

* cited by examiner

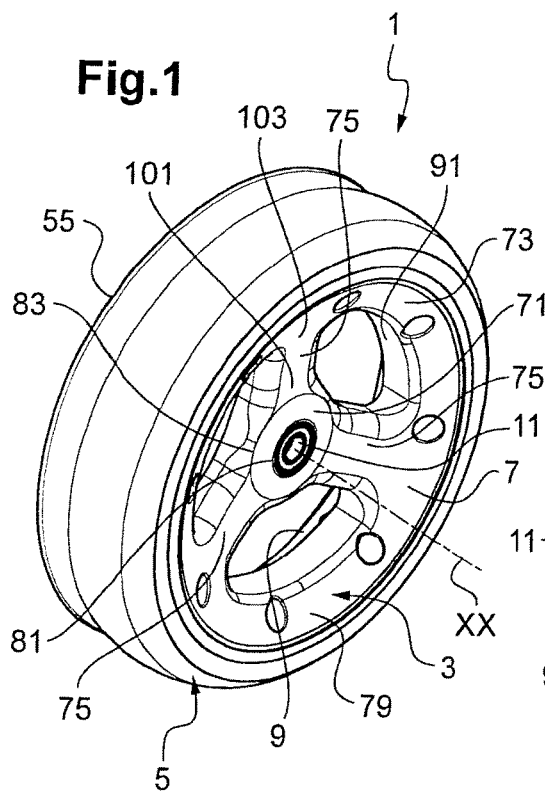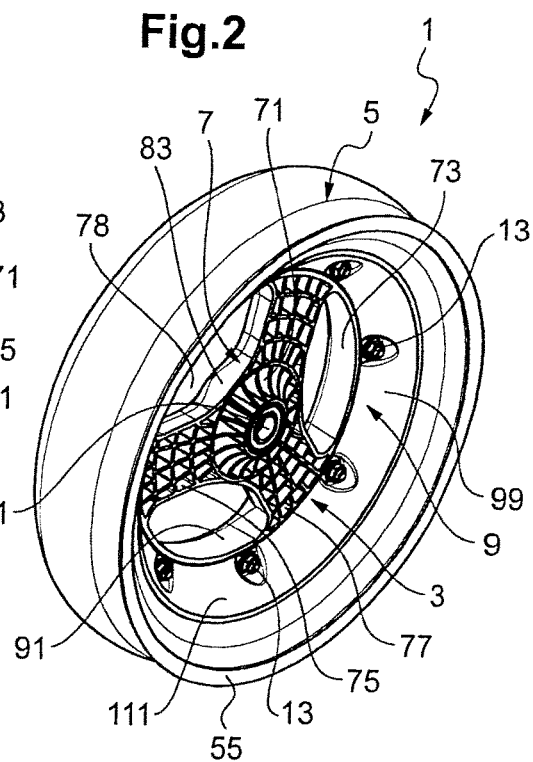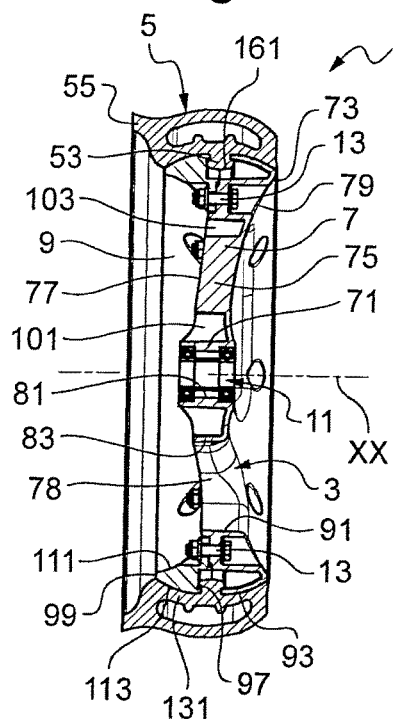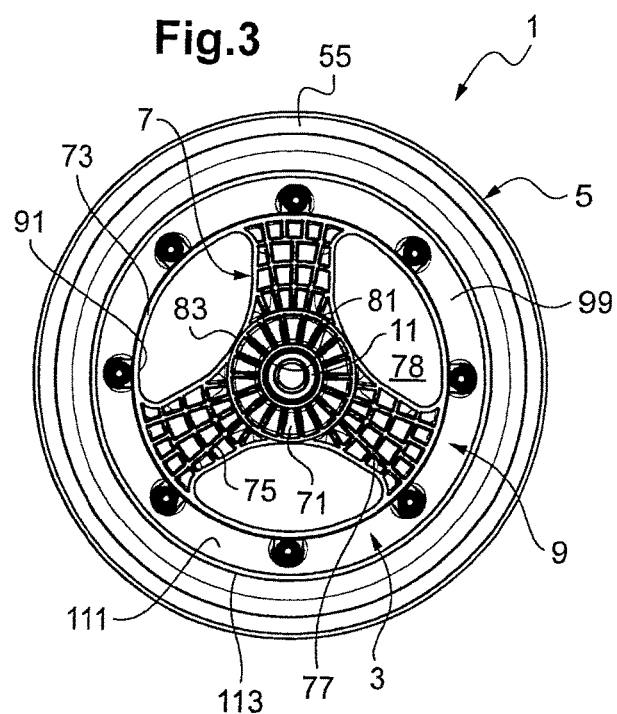

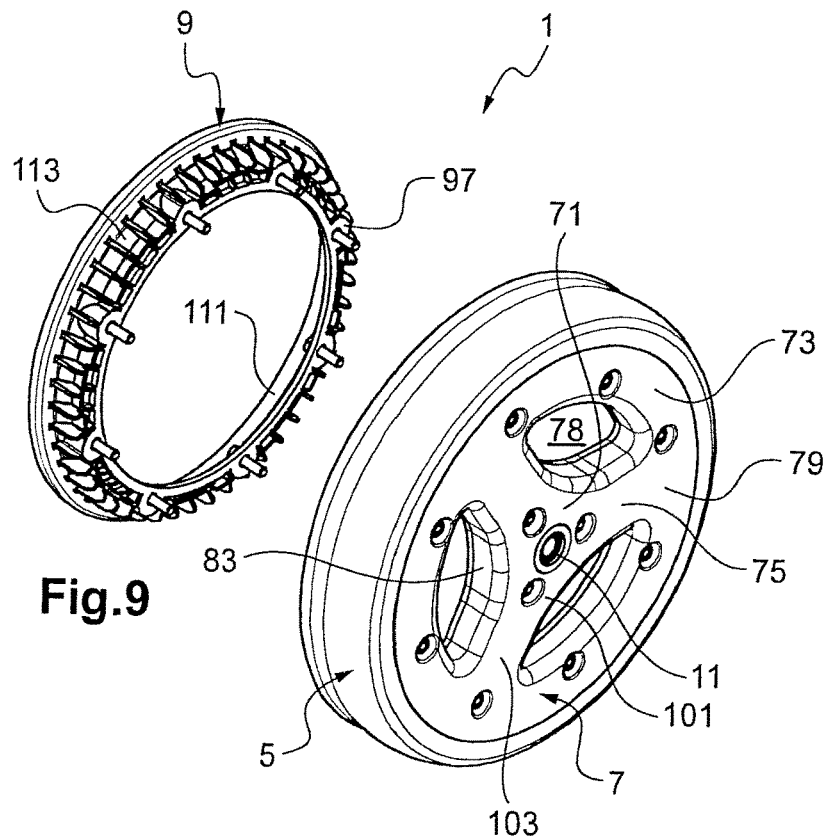

WHEEL FORMING AN IMPROVED AGRICULTURAL TOOL

BACKGROUND OF THE INVENTION

Field of the Invention

The invention relates to agricultural tools and more particularly tools comprising mainly one or more wheels.

In tools of this type, the wheel(s) is/are generally used to work the soil. The wheels may operate alone or in conjunction with other portions of the tool.

In the case of a sowing machine, for example, the tool comprises a portion which is provided to open a furrow in the soil, typically a ploughshare, a disc or a tooth, and one or more wheel(s) in order to close the furrow and/or to pack the earth after the seeds have been deposited at the bottom of the furrow.

Some tools, such as the above-mentioned sowing machine, also comprise so-called "depth control" wheels which control the working depth of the remainder of the tool. In the case of a tool comprising a ploughshare, for example, depth control wheels are mounted so as to be fixedly joined to the ploughshare so that, whilst travelling over the ground, the wheels retain the active portion of the ploughshare at a substantially constant depth.

Most often, the wheels with which agricultural tools are provided are intended to travel on the ground. They thus comprise a tire which is mounted around a portion of the wheel which forms the body thereof.

In order to prevent the tire from becoming disconnected from the wheel body during work, the portion of the wheel body which forms the rim is formed in a particular manner. This results in generally complex forms which complicate the production of the wheel body and also the mounting of the tire thereon.

That is the reason for which the wheels often comprise two similar flanges which are mounted one on the other in order to form the body of the wheel. The flanges are assembled one on the other by means of one of the main faces thereof, with the tire being enclosed.

Description of Related Art

In FR 2933903, the Applicant proposed an innovative wheel, whose shape of the wheel body prevents the tire from becoming detached from the rim during operation, including under extreme conditions. The body in question is formed by the mutual assembly of two similar flanges in a state face to face.

When they are used as tools, the wheels are generally subjected to great loads during operation.

In some cases, in particular when a sowing machine is provided therewith, the orientation of the wheel in the machine does not correspond to the advance direction of the machine: it is often the case that the wheel is inclined to a great extent in relation to the advance direction. Furthermore, the wheel may be inclined in relation to the vertical relative to the ground. During operation, this results in very great stress on the wheel body.

In order to ensure that the wheel withstands those stress, it is conventional to provide a quite solid wheel body. This results in a great wheel mass, which is not desirable. A great mass increases the production and transport costs and complicates the assembly of the wheel on the machine, in particular cantilever type assemblies.

An objective of the Applicant is to improve the situation.

BRIEF SUMMARY OF THE INVENTION

The Applicant proposes a tool comprising a first flange and a second flange which are mounted one on the other, forming a wheel body. The first flange comprises a central portion, a generally annular peripheral portion and at least one arm which connect(s) the central portion and the peripheral portion to each other. The second flange is homologous to the peripheral portion of the first flange. In the assembled state, the wheel body has a rim which is formed together by the peripheral portion of the first flange and the second flange and a hub which is formed by the central portion of the first flange.

In the tool proposed, the assembly and disassembly of the tire are facilitated as a result of the particular configuration of the wheel body. The wheel body has a mechanical strength which is at least equal to conventional wheels, at least sufficient for working in fields. The production of the wheel body requires a far smaller amount of raw materials. The tool proposed has reduced production times and costs.

The tool may have the following optional features, taken alone or in combination with each other.

- the first flange and the second flange are produced from two different materials. Thus, the mechanical properties of each of the materials are better adapted to the particular functions of each of the two flanges,
- the second flange is produced from metal. Since the second flange generally has a material volume which is less than that of the first flange, the increase in mass in relation to a second flange of plastics material remains small,
- the first flange is produced from plastics material and the second flange is produced from plastics material. The mass of the wheel body is thus small in relation to a wheel body which comprises at least one metal flange,
- the second flange is formed by at least two components which are generally in the form of annular sections. The size of the installations for producing the second flange, for example, the moulds, may have reduced dimensions. The second flange occupies a small space before the assembly thereof. This makes transport easier,
- each one of the first flange and the second flange supports a tire which is fitted on the rim. The force withstood by the wheel body as a result of the clamping of the tire is thus better distributed. The concentrations of stress and the risks of breakage are reduced,
- when the two flanges are in the state mounted one on the other, the hub of the first flange at least partially projects into an internal space which is defined by the annular form of the second flange. The equilibrium of the wheel body as a whole mounted on an axle is thus improved. In particular, this equilibrium may be controlled in accordance with the stress during operation,
- the peripheral portion of the first flange and the second flange each have an external surface whose diameter in the region of the interface between the first flange and the second flange in the assembled state is different from the diameter at the side opposite the interface between the first flange and the second flange, so that the rim has a seat which is generally concave or convex and which is capable of receiving a tire. The tire is retained axially by the seat itself. The risk of accidental detachment from the rim is thus reduced,
- the peripheral portion of the first flange and the second flange are mutually formed so that the assembly thereof defines a groove which extends substantially over the circumference of the wheel body at the interface of the peripheral portion of the first flange and the second flange. The groove is capable of receiving a bead of a tire. The tire is thus retained in a radial direction in the groove. The risk of accidental detachment from the rim is thus reduced, the first flange is monobloc and the second flange is monobloc. The production of one and/or the other may be brought about by a single molding operation. The risk of breakage of one of the two flanges during operation is reduced.

BRIEF DESCRIPTION OF THE DRAWINGS

Other features, details and advantages of the invention will be appreciated from a reading of the following detailed description and the appended drawings, in which:

FIG. 1 is a perspective view of a tool according to the invention,

FIG. 2 is a view of the tool of FIG. 1 from another point of view,

FIG. 3 is a view from a face of the tool of FIG. 1,

FIG. 4 is a cross-section of the tool of FIG. 1,

FIG. 9 is an exploded, perspective view of a tool according to the invention, FIG. 10 is a cross-section of the tool of FIG. 9, in which the tool is illustrated in a state without any tire.

DETAILED DESCRIPTION OF THE INVENTION

The drawings and the description below mainly contain elements of a specific nature. Therefore, they may not only be used to better understand the present invention, but may also contribute to the definition thereof, where applicable.

Figure 5:
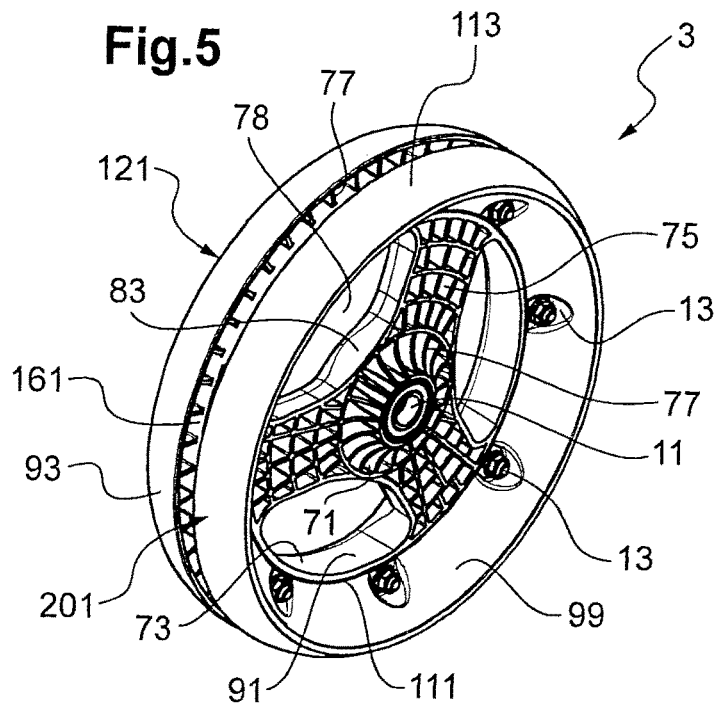
FIG. 5 is a view similar to FIG. 2, in which the wheel body is illustrated in a state without any tire.
Figure 6:
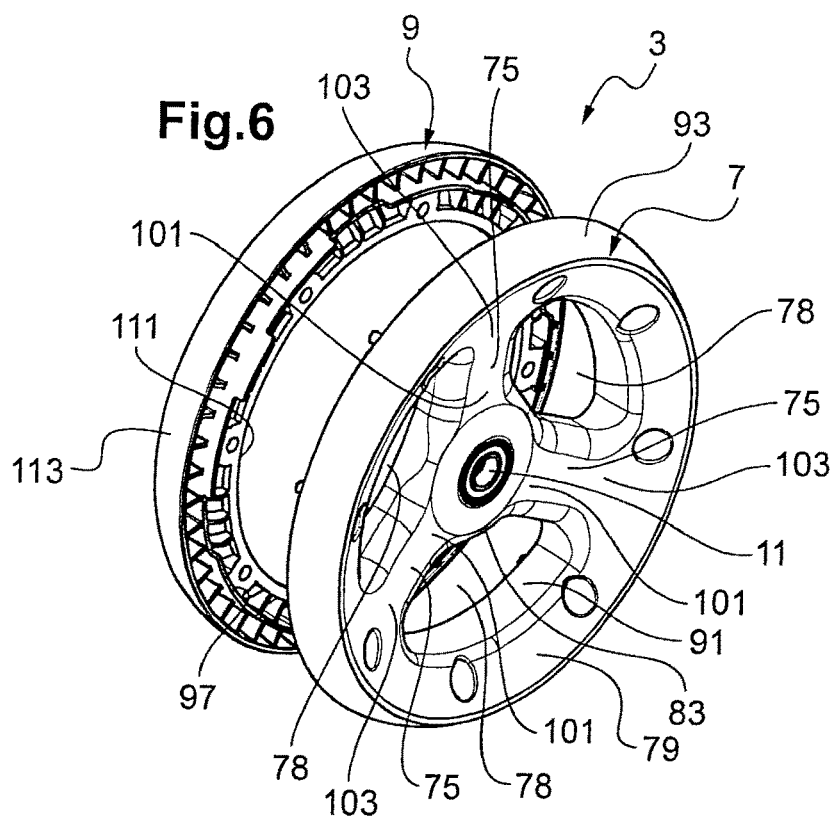
FIG. 6 is an exploded, perspective view of the wheel body of FIG. 5.
Figure 7:
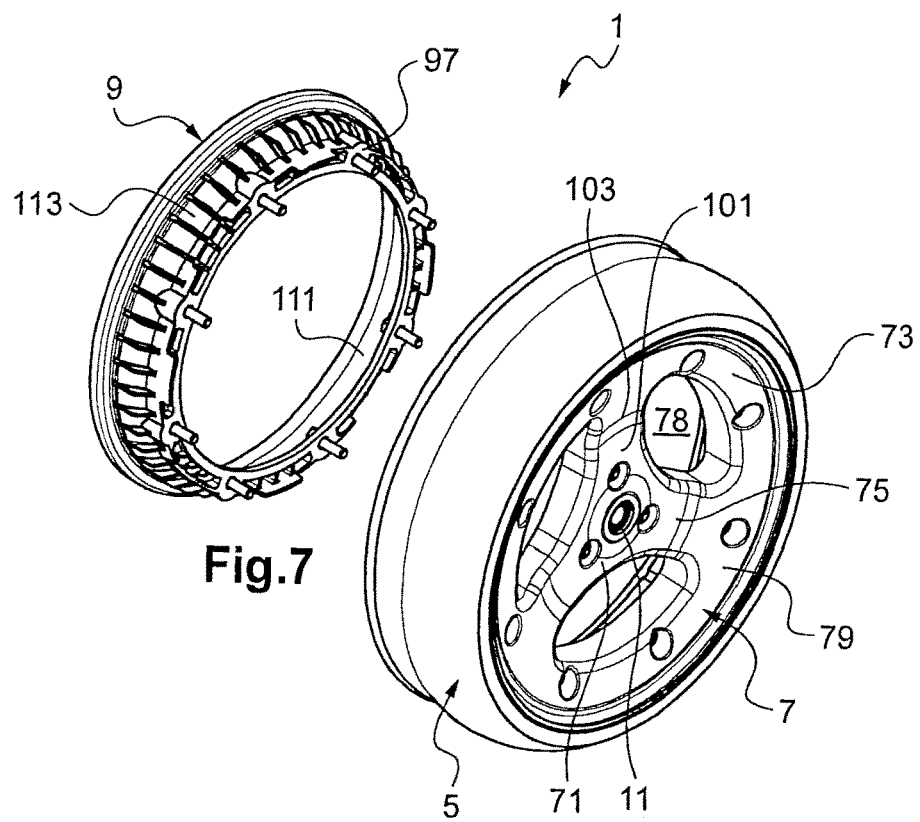
FIG. 7 is an exploded, perspective view of a tool according to the invention.

FIGS. 1 to 4 show a field working tool in the form of a wheel 1. The wheel 1 comprises a wheel body 3, around which a tire 5 is mounted. FIGS. 5 and 6 show the wheel body 3 of the embodiment of FIGS. 1 to 4 before the tire 5 has been mounted thereon.

In the remainder of the description, the term "body" or "wheel body" is used to refer to the practically non-deformable portion of the wheel as opposed to the deformable portion which the tire constitutes. The term "rim" or "wheel rim" is used to refer to the portion which is located at the periphery of the wheel body and which is intended to support the tire. The remainder of the wheel body may be referred to as the "disc", "wheel disc", "dish" or "wheel dish". In other words, the wheel body is constituted by the rim and the wheel disc. In this instance, the term "rim" is not intended to refer to the whole of the wheel body unlike the use, which is incorrect, which may be made thereof generally.

The wheel body 3 is formed by a first flange 7 and a second flange 9 which are generally circular. The first flange 7 and the second flange 9 which are illustrated separately in FIG. 6 are assembled one on the other in order to form the wheel body 3 as illustrated in FIG. 5.

The first flange 7 and the second flange 9 each have a center axis or axis of revolution. Those center axes are aligned in the assembled state and coincide with the axis of rotation of the wheel 1 during operation. Those axes are designated XX in the Figures.

The first flange 7 and the second flange 9 each have an internal face 77 and 97, respectively, and an opposing external face 79 and 99, respectively. During the assembly of the first flange 7 and the second flange 9 one on the other, the internal faces 77 and 97 are placed face to face. The external faces 79 and 99 are orientated opposite to each other toward the outer side of the wheel body 3.

The first flange 7 and the second flange 9 are fixed, in this instance in a reversible manner, to each other in order to form the wheel body 3 by means of fixing members. In the example described here, the fixing members comprise screw/nut pairs 13. The screw/nut pairs 13 allow the first flange 7 and the second flange 9 to be held together. In this instance, the screw/nut pairs 13 are distributed in accordance with the periphery of the wheel body. Instead or in addition, other fixing means may be used, for example, clips or rivets.

The first flange 7 comprises a central portion 71, a peripheral portion 73 and at least one arm 75 which connect(s) the central portion 71 to the peripheral portion 73. In this instance, the first flange 7 comprises three arms 75.

The central portion 71 is generally generated by revolution. In the assembled state, the central portion 71 forms the hub of the wheel 1. The central space of the revolution type shape of the central portion 71 is capable of receiving an axle or an axle stub which are intended to support the wheel 1 so as to rotate freely about the rotation axis XX. The wheel 1 comprises a rotary bearing which is received in the central portion 71, in this instance in the form of a ball bearing 11. In a variant, the ball bearing 11 may be replaced by other types of roller bearing and more generally by a bearing of a different type, such as a plain bearing, for example.

The central portion 71 has an internal surface 81 which is generally orientated toward the main axis XX and which here forms a hole which is capable of receiving the roller bearing 11. The central portion 71 has a peripheral external surface 83 which is opposite the internal surface 81.

The peripheral portion 73 is generally of annular form. The peripheral portion 73 is delimited in the direction of the main axis XX by an internal edge and an external edge. The peripheral portion 73 and the central portion 71 are substantially concentric and centered about the main axis XX. The peripheral portion 73 surrounds the central portion 71. In the example illustrated in FIG. 4, the peripheral portion 73 and the central portion 71 are offset relative to each other in the direction of the main axis XX. At the side of the internal face 77 (on the left in FIG. 4), the central portion 71 projects in relation to the internal edge of the peripheral portion 73 in the direction of the main axis XX practically over the entire length of the central portion 71. At the side of the external face 79 (on the right in FIG. 4), the central portion 71 is arranged so as to be recessed with respect to the external edge of the peripheral portion 73. The external end of the central portion 71 is almost aligned with the internal edge of the peripheral portion 73. In a variant, the peripheral portion 73 and the central portion 71 may be substantially coplanar in accordance with a plane perpendicular to the main axis XX.

The peripheral portion 73 has an internal surface 91, or diametrically internal surface, which is generally orientated toward the central portion 71 and an external surface 93, or diametrically external and peripheral surface, opposite the internal surface 91. In this instance, the internal surface 91 has a generally cylindrical form which is interrupted by the arms 75. In this instance, the external surface 93 has a generally annular form with a profile which is rounded and curved in an outward direction.

Each arm 75 has an internal end 101 which is connected to the central portion 71 at the external surface 83 thereof and an external end 103 which is opposite the internal end 101 and which is connected to the peripheral portion 73 at the internal surface 91 thereof. Thus, each arm 75 connects the central portion 71 and the peripheral portion 73 to each other. The arms 75 extend radially. They form radii of the wheel 1.

In this instance, the internal end 101 of each of the arms 75 is connected to the external surface 83 substantially over the entire length of the central portion 71 in the direction of the main axis XX. The arms 75 have a thickness, in the direction of the main axis XX, which decreases slightly then increases in a regular manner from the central portion 71 as far as the external end 103, where it is at a maximum and substantially equal to the thickness of the peripheral portion 73. In this manner, the external end 103 of each arm 75 is substantially aligned with the peripheral portion 73, to which it is connected. The central portion 71 projects relative to the plane defined by the internal edge of the peripheral portion 73. The portion of the internal face 77 of the first flange 7 defined by the arms 75 generally has a frustoconical form which connects the internal ends of the central portion 71 and the peripheral portion 73 to each other. The portion of the external face 79 of the first flange 7 defined by the arms 75 is substantially concave, in the form of a cup which is centered on the main axis XX. The external end of the central portion 71 projects slightly into the bottom of the cup-like form.

Spaces 78 are defined between the arms 75 and the internal surface 91 of the peripheral portion 73. The distribution of the arms 75 around the central portion 71 defines the same number of intervening spaces 78. Those spaces 78 are free and extend through in the direction of the main axis XX from the internal face 77 to the external face 79. During operation, the spaces 78 make it easier for debris and mud to be discharged through the first flange 7. The arms 75 and the intervening spaces 78 together form an open disc of a wheel.

The arms 75 are regularly distributed in an angular manner about the main axis XX. In the examples described here, there are three arms which are spaced apart from each other by 120°. That configuration ensures sufficient mechanical strength for the applications envisaged whilst allowing economy of material in relation to a solid disc of a wheel. In variants, the number and/or distribution of the arms 75 may be different.

In the examples described here, the first flange 7 is formed as a monobloc component. The first flange 7 is obtained, for example, by injection molding. In this instance, the first flange 7 is produced from plastics material, for example, polyamide, such as polyamide 6-6, or polypropylene. The first plastics flange 7 has low costs in terms of raw materials and production. Nevertheless, the first flange 7 may also be produced from metal. Thus, the first metal flange 7 has improved resistance to impacts, for example, in the event of stones being thrown during the movement of the machine.

As appears in FIGS. 2 to 6, the first flange 7 may be in the form of a casing which is consolidated by internal reinforcement walls, or ribs, between which multiple cavities are left empty. The ribs confer on the first flange 7 good mechanical strength which is comparable to a solid metal component and/or a solid plastics component. They ensure the necessary mechanical strength with few raw materials. The volume occupied by the first flange 7 is mainly hollow.

Where applicable, the number, distribution and form of the ribs may be adapted in accordance with the mechanical strength desired for the first flange 7. Modeling tools of the finite element type may be used.

The central portion 71 receives the roller bearing 11. During assembly, the roller bearing 11 is mounted coaxially with respect to the main axis XX of the wheel body 3. The roller bearing 11 is retained in this position by means of the housing so that the main axis XX of the wheel body 3 coincides with the rotation axis of the wheel 1 during use.

In the example described here, the internal surface 81 of the central portion 71 of the first flange 7 is in the form of a through-hole in accordance with the main axis XX. In this instance, the hole is constituted by a succession, in the direction of the main axis XX, of three portions which are substantially cylindrical and concentric. The central portion has a small diameter while the internal portion and the external portion each have a large diameter. The two large diameters are equal in this instance. The central portion is connected to each of the internal portion and the external portion by a respective annular shoulder which is orientated toward the internal side and the external side of the first flange, respectively.

The roller bearing 11 has a form which corresponds to the internal surface 81. The roller bearing 11 is formed by an assembly of at least two components. During the installation of the roller bearing 11 in the internal surface 81, each of the two components is inserted from the internal side and from the external side of the internal surface 81, respectively, in order to move into abutment with each of the annular shoulders, respectively. Once the two components are assembled with each other, the two shoulders form axial stops and oppose the removal of the roller bearing 11 from the housing.

The second flange 9 is homologous to the peripheral portion 73 of the first flange 7. The second flange 9 is of generally annular form. The second flange 9 does not have any arms or a central portion forming a hub. The second flange 9 has an internal surface 111 which is homologous to the internal surface 91 of the first flange 7, which is generally orientated toward the rotation axis XX and an external surface 113 which is homologous to the external surface 93 of the first flange 7 and which is opposite the internal surface 111. The internal surface 111 of the second flange 9 and the internal surface 91 of the first flange 7 operate in a similar manner.

In the example illustrated in the Figures, the second flange 9 is in the form of a ring which has a solid cross-section and which is generally triangular. One of the sides of the triangle-like form carries the external surface 113 which is homologous to the external surface 93 of the peripheral portion 73 of the first flange 7. The external surface 113 has a generally annular form with a profile which is rounded and curved toward the outer side.

During the assembly of the two flanges 7, 9 one on the other, the spaces 78 of the first flange 7 move opposite the internal free space of the annular form of the second flange 9. Therefore, the spaces 78 remain through-spaces. The wheel body 3 has an open-disc wheel.

In the examples described here, the second flange 9 is formed as a monobloc component. The second flange 9 is obtained by molding. The second flange 9 is in the form of a collar or peripheral rim. In a variant, the second flange 9 may be obtained by stamping or drawing from a metal sheet. In this instance, the second flange 9 is produced from metal, for example, steel. In a variant, aluminum may be used. The second flange 9 has high mechanical strength. Nevertheless, the second flange 9 may also be produced from a plastics material, for example, similar to the one of the first flange 7.

The first flange 7 of plastics material has a low production cost while the second flange 9 of metal confers on the wheel body 3 the mechanical strength necessary for working in fields. Nevertheless, the two flanges 7, 9 may both be produced from metal, for example, when the mechanical stress anticipated are severe, or both from plastics material, for example, when the mechanical stress anticipated are moderate. The general configuration of the wheel body 3 formed by the first flange 7 and the second flange 9 allows adaptation of the mechanical behavior of the wheel body 3, adapting the materials used without affecting the general configuration of the wheel body 3. In a variant, the first flange 7 and/or the second flange 9 may be produced by assembling a plurality of components rather than by means of a monobloc component. For example, the peripheral portion 73 of the first flange 7 and/or the second flange 9 may be formed from a plurality of annular sections.

Once the two flanges 7, 9 have been mutually assembled, the wheel body 3 has a rim 121 which is formed together by the peripheral portion 73 of the first flange 7 and the second flange 9 which is homologous to the peripheral portion 73. Thus, the rim 121 has an external surface which is formed together by the external surface 93 of the peripheral portion 73 of the first flange 7 and by the homologous external surface 113 of the second flange 9. That external rim surface forms a seat 201 of a wheel body 3. The seat 201 receives the tire 5.

Once the tire 5 has been fitted on the rim 121, the first flange 7 and the second flange 9 support the tire 5, each one substantially by a half here. The surface-area of the external surface 93 of the first flange 7 covered by the tire 5 is substantially equivalent to the surface-area of the homologous external surface of the second flange 9 covered by the tire 5. The first flange 7, the second flange 9 and the tire 5 are mutually configured so that the radial force applied by the tire 5 which surrounds the wheel body 3 is substantially distributed in an equivalent manner over the two flanges 7, 9. Neither the first flange 7 nor the second flange 9 has the sole function of blocking the tire 5 in the direction of the main axis XX. In a variant, the distribution of the forces may be unbalanced, for example, up to a ratio of 4 to 1.

The tire 5 comprises a sole 131 in abutment with the seat 201 of the rim 121. The configurations of the sole 131, on the one hand, and the seat 201, on the other hand, are selected so as to correspond, substantially with form-fitting correspondence. The tire 5 is retained around the wheel body 3. The risk of accidental detachment from the rim is low even under difficult conditions.

In the examples described here, the tire 5 is a tire of the semi-hollow type. The tire 5 is of the non-inflatable type. The internal space between the sole 131 and the running tread profile is in fluid communication with the exterior via an opening which is not illustrated. This allows greater deformation of the tire 5 during operation, thereby making it easier to remove mud.

In the embodiments illustrated in the Figures, the seat 201 has a diameter which varies in the direction of the main axis XX. The seat 201 has a form which is not strictly cylindrical. In the region of the interface between the first flange 7 and the second flange 9, that is to say, in the region of the internal faces 77, 97, the diameter of the seat 201 is substantially different from the diameter of the seat 201 in the region of the opposing faces, that is to say, the external faces 79, 99. This can be seen in FIGS. 4, 8, 10 and 12 as a cross-section. Thus, portions of the seat 201 oppose the axial movement of the tire 5. The risk of accidental detachment from the rim is particularly small. The addition of a specific component forming a blocking wall is unnecessary.

In the embodiments of FIGS. 1 to 6 and 11 and 12, in the region of the interface between the first flange 7 and the second flange 9, the diameter of the seat 201 is greater than the diameter of the seat 201 in the region of the opposing faces of the flanges 7, 9 with the exception of a groove 161. The seat 201 thus has a generally convex form. That configuration allows, for example, the use of tires whose sole 131 is concave and covers a convex seat 201 by partially surrounding it. Such tires are described, for example, in FR 2 933 903.

In a variant, in the region of the interface between the first flange 7 and the second flange 9, the diameter of the seat 201 is less than the diameter of the seat 201 in the region of the opposing faces. The seat 201 thus has a generally concave form. The seat 201 has surfaces which oppose the axial displacement of the tire 5.

In the embodiments of FIGS. 7 to 10, the peripheral portion 73 of the first flange 7 and the second flange 9 are mutually formed so that the assembly thereof defines the groove 161. The groove 161 extends substantially over the circumference of the wheel body 3, at the interface of the peripheral portion 73 of the first flange 7 and the second flange 9. The groove 161 is capable of receiving a corresponding bead 53 of the tire 5. The retention of the tire 5 around the wheel body 3 is further improved.

In each of the embodiments illustrated in the Figures, the wheel body 3 is asymmetrical. In particular, the hub formed by the central portion 71 of the first flange 7 is offset in relation to the center of the wheel body 3 in accordance with the main axis XX. The hub of the first flange 7 at least partially projects into the internal space defined by the annular form of the second flange 9 in accordance with the embodiments to a greater or lesser extent. That feature is optional but allows better balancing of the tool 1 once it is installed on the remainder of the machine.

The tire 5 as illustrated in FIGS. 1 to 4 has an asymmetrical profile. The sole 131 and the seat 201 each have a plane of symmetry perpendicular to the main axis XX. The portion of the tire 5 opposite the sole 131, the running tread profile, is asymmetrical. The running tread profile has a lip 55. The lip 55 projects from the tire 5 substantially in the direction of the main axis XX, toward the outer side, at the side of the external face 99 of the second flange 9. The lip 55 extends substantially over the circumference of the tire 5. Such a wheel 1 provided with a tire 5 having a lip 55 is provided to be installed on a machine as schematically illustrated in FIGS. 14A to 14D.

The embodiments of FIGS. 7 to 13 are similar to that of FIGS. 1 to 6. The functionally identical portions therein have the same reference numerals. In these embodiments, the roller bearing 11 comprises a double row of oblique contact balls and is received in a cartridge. The cartridge is generally of cylindrical external form. The diameter of the roller bearing is constant unlike the embodiment described above. The internal surface 81 of the central portion 71 of the first flange 7 is in the form of a through-hole in accordance with the main axis XX having a diameter which is constant over the length thereof.

Figure 8:
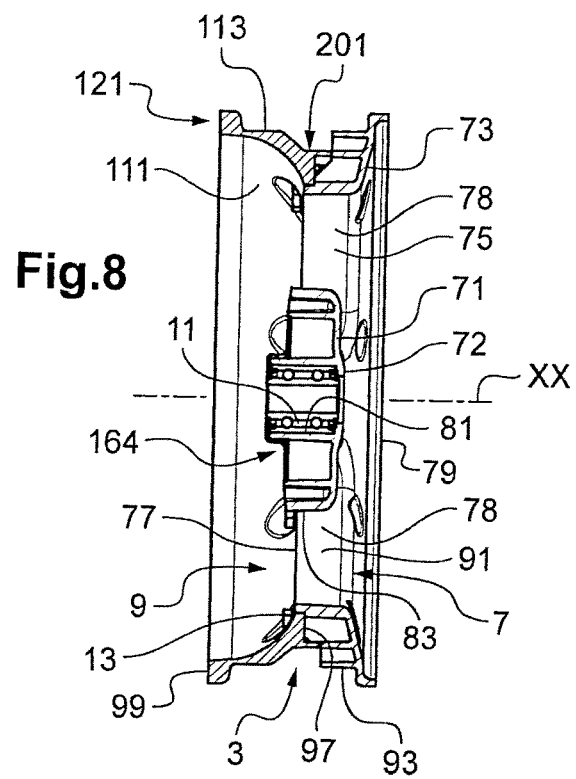
FIG. 8 is a cross-section of the tool of FIG. 7, in which the tool is illustrated in a state without any tire.
Figure 11:
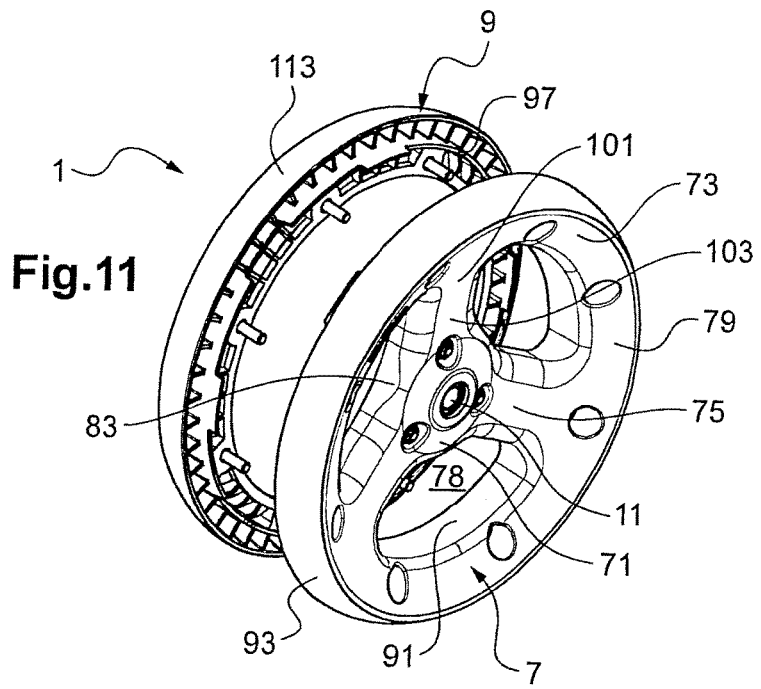
FIG. 11 is an exploded, perspective view of a tool according to the invention, in which the tool is illustrated in a state without any tire.
Figure 12:
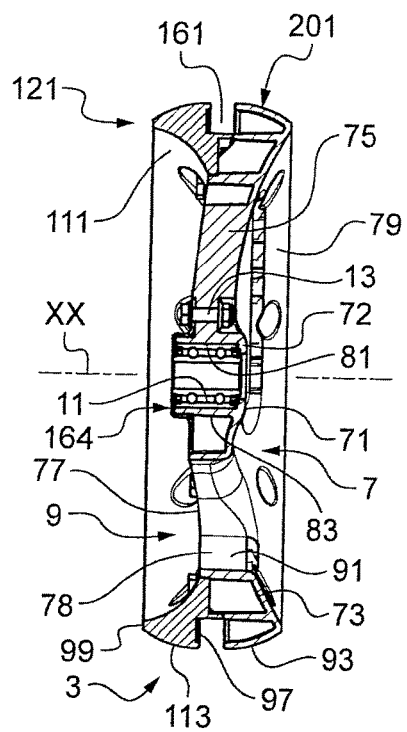
FIG. 12 is a cross-section of the tool of FIG. 11.

On the right in FIGS. 8, 10 and 12 in cross-section, the central portion 71 further comprises an axial stop 72 which is configured so as to limit the translation movement of the roller bearing 11. The axial stop 72 is formed in this instance at the side of the external face 79 of the first flange 7. Consequently, the insertion and removal of the roller bearing 11 may be carried out at the opposite side. The axial stop 72 allows control of the positioning of the roller bearing 11 in relation to the first flange 7. The axial stop 72 may be considered to be a bottom of the housing.

Figure 13:
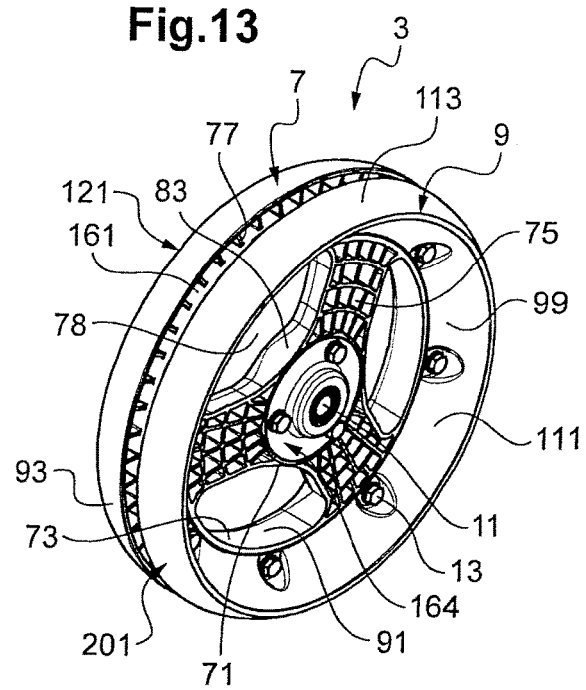
FIG. 13 is a view similar to FIG. 2 of the tool of FIG. 11, and FIGS. 14A to 14D show an agricultural machine in which two tools according to the invention are assembled.

On the left in FIGS. 8, 10 and 12 in cross-section and in FIG. 13, the wheel 1 further comprises a fitted component 164 or shell. The fitted component 164 is formed so as to be fixed to the wheel body 3, enclosing the roller bearing 11 which is received in the central portion 71 of the first flange 7. In this instance, the fitted component 164 is generally in the form of a disc, in which a circular central opening is provided. In this instance, the fitted component 164 is produced by stamping a piece of sheet metal. In the installed state, the fitted component 164 partially covers the central portion 71.

The fitted component 164 is fixed at the open side of the housing for the roller bearing 11, that is to say, here, at the side of the internal face 77. The fitted component 164 is fixed with the screw/nut pairs 13 which are arranged in the region of the center of the wheel 1. Once fixed against the central portion 71, the fitted component 164 forms a cover of the housing and an axial stop for the roller bearing 11. The roller bearing 11 is enclosed inside the housing. The opening at the center of the fitted component 164 allows the introduction of an axle for mounting the wheel 1 on an agricultural machine. The disassembly of the fitted component 164 is sufficient for opening the housing and releasing the roller bearing 11. During operation, the fitted component 164 ensures the axial retention of the roller bearing 11.

The fitted component 164, at least partially covering the hub, protects it from the environment. For example, the fitted component 164 protects the hub and the roller bearing 11 which is received therein from the impacts resulting from small stones being thrown during operation. The fitted component 164 also protects from stress and friction which may result from the accumulation of dried earth near the moving portions of the wheel 1. The fitted component 164 forms a protection shield for the hub.

FIGS. 14A to 14D partially illustrate a sowing machine 500, in which tools 1 similar to the tool of FIGS. 1 to 12 each cooperate with a disc 501. Thus, the tool 1 forms a depth control wheel. The tool 1 can rotate freely but is fixedly joined to the disc 501 in a substantially vertical direction. In this manner, even in the presence of irregularities in a field, the disc 501 operates at a substantially constant depth in relation to the surface of the ground. Furthermore, the respective axes of the tool 1 and the disc 501 are offset relative to each other. During the advance movement of the sowing machine 500, the lip 55 of the tool 1 scrapes against one of the faces of the disc 501, thereby cleaning from it any mud and debris which could be fixed thereto. In this example of an application of the tool 1, one of the two faces of the tool 1 is inaccessible during operation: the side of the tool 1 corresponding to the external face 99 of the second flange 9 is not very accessible because of the presence of the disc 501.

In the examples illustrated in the Figures, the lip 55 of the tire 5 is located at the side of the second flange 9. In this configuration, a large free space is provided inside the wheel 1 at the side of the lip 55. The free space particularly allows, partially in the internal space defined by the tire 5, an arm 502 of an agricultural machine frame which supports an axle provided substantially in accordance with the main axis XX, to be received. FIGS. 14A to 14D show an example of such an assembly. In this example, the arm 502 of the frame must be able to extend between the main axis XX in the region of the roller bearing 11 and the periphery of the wheel 1. The arm 502 of the frame must further not impair the operation of the disc 501 which is arranged in contact with a portion of the lip 55 and which partially closes a face of the wheel 1. In variants, the lip 55 may be arranged at the same side of the wheel 1 as the first flange 7, in a state facing the disc 501.

Figure 14A:
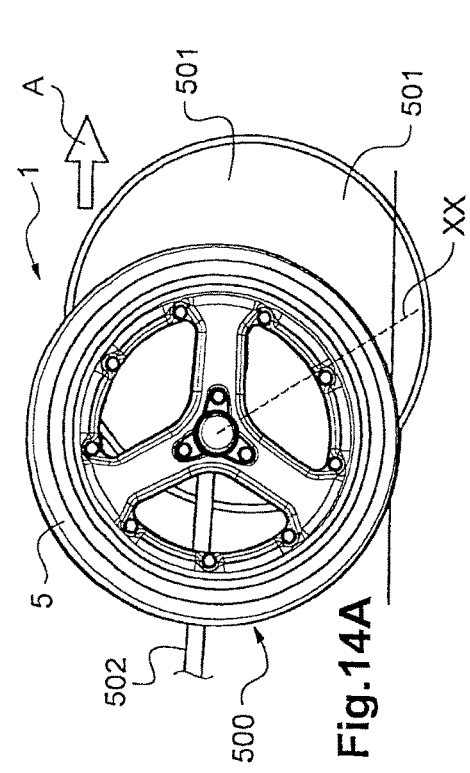
Figure 14D:
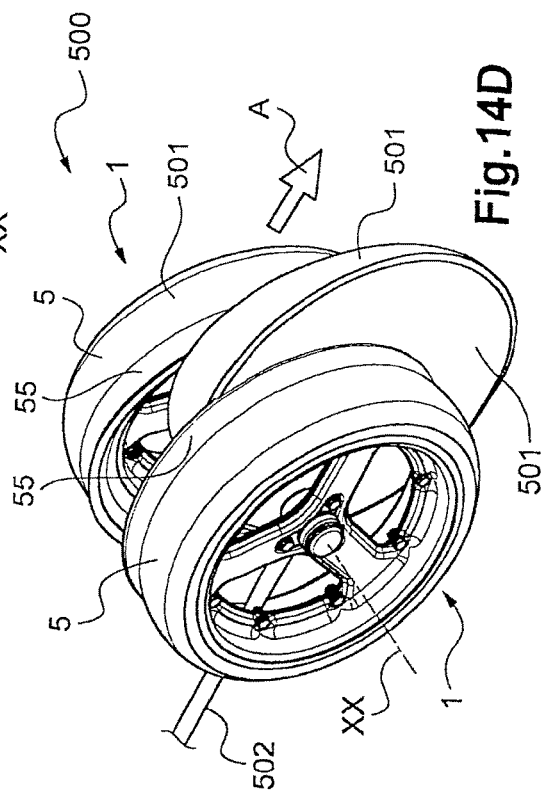
Figure 14B:
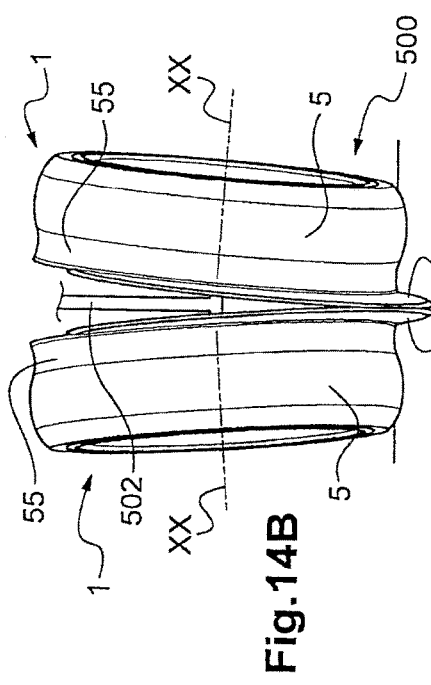

As can be seen in the front view of FIG. 14B, that is to say, orientated toward the rear in the direction of advance of the sowing machine 500, the sowing machine 500 has a so-called "V-like" configuration. Two discs 501 cooperate in order to dig a furrow in the ground. The two discs 501 are mutually symmetrical in relation to a vertical plane which extends in the advance direction illustrated by the arrow A. The discs 501 are not arranged in the vertical state but are instead orientated partially toward the ground. They form, for example, an angle of approximately 5° with the vertical. A wheel 1 cooperates with each of the discs 501. The two wheels 1 have an orientation similar to that of the discs 501, although the value of the angle may be different.

Figure 14C:
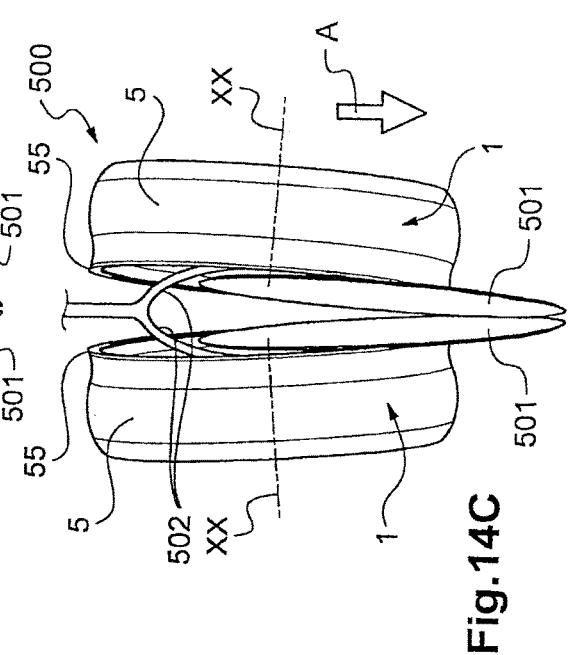

As may be seen in the plan view of FIG. 14C, the sowing machine 500 further has a "V-like" configuration in accordance with another orientation in space. The two discs 501 also form an angle with the advance direction of the sowing machine 500. In this instance, the angle is also approximately 5°. The wheels 1 have an orientation similar to that of the discs 501, although the value of the angle may be different.

As a result of those specific orientations, the loads to which the wheels 1 are subjected and which result from the resistance of the terrain and friction are great. They are greater than those to which an identical wheel 1, the rotation axis XX of which would be substantially perpendicular to the advance direction and/or horizontal, would be subjected.

The stress tend to become concentrated in the region of the hub and the connection to the axle. The improvements provided by the invention therefore have a specific advantage for agricultural tools having a similar configuration.

A tool according to the invention has the mechanical strength necessary for working in fields while being produced by means of two flanges which are produced with less material than existing wheel bodies having two flanges. With the functions of each flange being differentiated, they have different structures from each other. Raw material may be saved by not providing the second flange with arms and a central portion. The wheel body is refined and made lighter. The transport and production costs are reduced.

The production of at least one of the two flanges, the one having an annular form recessed at the center thereof, is simplified and more rapid. The production costs are thereby further reduced.

In existing wheels having two flanges, good cooperation between three elements is complex to bring about. For example, the roller bearing had to be dimensioned and retained not only in relation to the first flange, but also in relation to the second flange. In the invention, the roller bearing does not cooperate directly with the second flange. For example, the roller bearing received in the hub may be removed from the housing thereof in order to be replaced during maintenance, without it being necessary to disassemble the two flanges and whatever the state of the second flange.

The production tolerances may be increased.

The invention is not limited to the examples of tools described above, merely by way of example, but also includes all the variants which the person skilled in the art may envisage within the scope of the appended claims.

The invention claimed is:

1. A tool for working in fields, the tool comprising:
a first flange and a second flange which mount on each other, forming a wheel body, the first flange comprises a central portion, an annular peripheral portion and at least one arm which connects the central portion and the peripheral portion to each other, the peripheral portion including an external surface and an internal surface, the second flange including an internal surface and an external surface, the internal surface of the second flange enclosing a hollow space when the second flange is unassembled,
wherein the external surface of the peripheral portion is structurally homologous to the external surface of the second flange, and the internal surface of the peripheral portion is structurally homologous to the internal surface of the second flange, and
wherein the wheel body has a rim which is formed together by the peripheral portion of the first flange and the second flange and a hub which is formed by the central portion of the first flange.

2. The tool as claimed in claim 1, wherein the first flange and the second flange are produced from two different materials.

3. The tool as claimed in claim 1, wherein the second flange is produced from metal.

4. The tool as claimed in claim 1, wherein the first flange is produced from plastics material and the second flange is produced from plastics material.

5. The tool as claimed in claim 1, wherein the second flange is formed by at least two components which are generally in the form of annular sections.

6. The tool as claimed in claim 1, wherein each one of the first flange and the second flange supports a tire which is fitted on the rim.

7. The tool as claimed in claim 1, wherein, in state mounted on each other, the hub of the first flange at least partially projects into an internal space which is defined by the annular form of the second flange.

8. The tool as claimed in claim 1, wherein the peripheral portion of the first flange and the second flange each have an external surface whose diameter in the region of the interface between the first flange and the second flange in the assembled state is different from the diameter at the side opposite the interface between the first flange and the second flange, so that the rim has a seat which is generally concave or convex and which is capable of receiving a tire.

9. The tool as claimed in claim 1, wherein the peripheral portion of the first flange and the second flange are mutually formed so that the assembly thereof defines a groove which extends substantially over the circumference of the wheel body at the interface of the peripheral portion of the first flange and the second flange, the groove being capable of receiving a bead of a tire.

10. The tool as claimed in claim 1, wherein the first flange is monobloc and the second flange is monobloc.

11. A tool for working in fields, the tool comprising:
a wheel body formed by a first flange and annular second flange to be mounted with each other,
the first flange comprising:
a central portion,
a generally annular peripheral portion, and
at least one arm which connects the central portion and the peripheral portion to each other, and
the second flange comprising an internal surface, the internal surface enclosing a hollow space when the second flange is unassembled,
wherein the wheel body includes a rim and a hub,
wherein the second flange is coupled to the peripheral portion of the first flange to define the rim, and
wherein the hub is defined by the central portion of the first flange.

12. The tool as claimed in claim 11, wherein the first flange and the second flange are produced from two different materials.

13. The tool as claimed in claim 11, wherein a thickness of the first flange and the thickness of the second flange are similar.

14. The tool as claimed in claim 1, wherein a thickness of the first flange and the thickness of the second flange are similar.

15. The tool as claimed in claim 11, wherein an annularity of the second flange is continuous.

16. The tool as claimed in claim 1, wherein an annularity of the second flange is continuous.

* * * * *